(12) United States Patent
St-Laurent et al.

(10) Patent No.: US 12,246,230 B2
(45) Date of Patent: Mar. 11, 2025

(54) COMPOSITE BALL BATS WITH TRANSVERSE INTERLAMINAR INTERFACES

(71) Applicant: EASTON DIAMOND SPORTS, LLC, Thousand Oaks, CA (US)

(72) Inventors: Frederic St-Laurent, Oak Park, CA (US); Dewey Chauvin, Simi Valley, CA (US)

(73) Assignee: EASTON DIAMOND SPORTS, LLC, Thousand Oaks, CA (US)

( * ) Notice: Subject to any disclaimer, the term of this patent is extended or adjusted under 35 U.S.C. 154(b) by 713 days.

(21) Appl. No.: 17/408,189

(22) Filed: Aug. 20, 2021

(65) Prior Publication Data
US 2023/0057457 A1   Feb. 23, 2023

(51) Int. Cl.
| | |
|---|---|
| *A63B 59/54* | (2015.01) |
| *B29C 70/30* | (2006.01) |
| *B29C 70/54* | (2006.01) |
| *B29K 105/08* | (2006.01) |
| *B29L 31/52* | (2006.01) |

(52) U.S. Cl.
CPC .............. *A63B 59/54* (2015.10); *B29C 70/30* (2013.01); *B29C 70/545* (2013.01); *A63B 2209/02* (2013.01); *B29K 2105/0881* (2013.01); *B29L 2031/52* (2013.01)

(58) Field of Classification Search
CPC ......... A63B 59/50; A63B 59/51; A63B 59/52; A63B 59/54; A63B 59/56
USPC ........................................ 473/564, 566, 567
See application file for complete search history.

(56) References Cited

U.S. PATENT DOCUMENTS

| | | | |
|---|---|---|---|
| 3,942,794 | A | 3/1976 | Gowins |
| 4,014,542 | A | 3/1977 | Yukio |
| 4,025,377 | A | 5/1977 | Yukio |
| 4,093,217 | A | 6/1978 | Silvio |
| 4,123,053 | A | 10/1978 | Silvio |

(Continued)

FOREIGN PATENT DOCUMENTS

WO   2000035540   6/2000

OTHER PUBLICATIONS

"ASTM F2219-14 Standard Test Methods for Measuring High-Speed Bat Performance," 2014.

(Continued)

*Primary Examiner* — Joseph B Baldori
(74) *Attorney, Agent, or Firm* — Perkins Coie LLP

(57) ABSTRACT

A ball bat includes a continuous tape of fiber material wrapped around the longitudinal axis in a helix extending along the longitudinal axis. Interlaminar interfaces between adjacent turns of the tape are oriented obliquely relative to the longitudinal axis. In some embodiments, the ball bat includes a preform structure, the tape being wrapped around the preform structure. In some embodiments, the ball bat includes a flared element on the preform structure. An end of the continuous tape may be positioned on an angled surface of the flared element. An outer skin may be positioned over the tape. Methods of making ball bats may include attaching a first end of a fiber tape to a flared element on a preform structure or a mandrel and wrapping the fiber tape around the preform structure or mandrel in a helix extending along the longitudinal axis of the preform structure or mandrel.

14 Claims, 8 Drawing Sheets

(56) References Cited

U.S. PATENT DOCUMENTS

| | | |
|---|---|---|
| 4,132,130 A | 1/1979 | Schneider |
| 4,150,291 A | 4/1979 | Gulley, Jr. |
| 4,324,400 A | 4/1982 | Tse |
| 4,505,479 A | 3/1985 | Souders |
| 4,600,190 A | 7/1986 | Berokoff |
| 4,604,319 A | 8/1986 | Evans |
| 4,672,541 A | 6/1987 | Bromley |
| 4,681,318 A | 7/1987 | Lay |
| 4,720,104 A | 1/1988 | Disieno |
| 4,780,346 A | 10/1988 | Denoel |
| 4,804,315 A | 2/1989 | Ferris |
| 4,818,584 A | 4/1989 | Eisenmann |
| 4,830,371 A | 5/1989 | Lay |
| 4,848,745 A | 7/1989 | Bohannan |
| 4,867,399 A | 9/1989 | Therond |
| 4,870,868 A | 10/1989 | Gastgeb |
| 4,938,478 A | 7/1990 | Lay |
| 4,963,408 A | 10/1990 | Huegli |
| 5,048,441 A | 9/1991 | Quigley |
| 5,057,353 A | 10/1991 | Maranci |
| 5,083,780 A | 1/1992 | Walton |
| 5,114,144 A * | 5/1992 | Baum ............ B29C 70/088 473/567 |
| 5,123,655 A | 6/1992 | Rones |
| 5,131,651 A | 7/1992 | You |
| 5,150,897 A | 9/1992 | Wortman |
| 5,180,163 A | 1/1993 | Lanctot |
| 5,188,059 A | 2/1993 | Rice |
| 5,197,732 A | 3/1993 | Lanctot |
| 5,284,332 A | 2/1994 | Ditullio |
| 5,301,940 A | 4/1994 | Seki |
| 5,364,095 A | 11/1994 | Easton |
| 5,380,002 A | 1/1995 | Spector |
| 5,380,003 A | 1/1995 | Lanctot |
| 5,395,108 A | 3/1995 | Souders |
| 5,415,398 A | 5/1995 | Eggiman |
| RE35,081 E | 11/1995 | Quigley |
| 5,511,777 A | 4/1996 | McNeely |
| 5,540,440 A | 7/1996 | Liu |
| 5,556,695 A | 9/1996 | Mazelsky |
| 5,593,158 A | 1/1997 | Filice |
| 5,620,179 A | 4/1997 | MacKay, Jr. |
| 5,624,114 A | 4/1997 | Kelsey |
| 5,624,115 A | 4/1997 | Baum |
| 5,641,366 A | 6/1997 | Hohman |
| 5,676,551 A | 10/1997 | Knight |
| 5,676,609 A | 10/1997 | Mollebaek |
| 5,676,610 A | 10/1997 | Bhatt |
| 5,722,908 A | 3/1998 | Feeney |
| 5,759,113 A | 6/1998 | Lai |
| 5,800,293 A | 9/1998 | MacKay |
| 5,804,707 A | 9/1998 | Scarton |
| 5,833,561 A | 11/1998 | Kennedy |
| 5,868,578 A | 2/1999 | Baum |
| 5,922,765 A | 7/1999 | Fleming |
| 5,954,602 A | 9/1999 | Eggiman |
| 5,982,352 A | 11/1999 | Pryor |
| 5,988,861 A | 11/1999 | Baum |
| 6,007,439 A | 12/1999 | MacKay, Jr. |
| 6,008,800 A | 12/1999 | Pryor |
| 6,022,282 A | 2/2000 | Kennedy |
| 6,033,758 A | 3/2000 | Kocher |
| 6,042,492 A | 3/2000 | Baum |
| 6,042,493 A | 3/2000 | Chauvin |
| 6,050,910 A | 4/2000 | Holman |
| 6,053,827 A | 4/2000 | MacKay, Jr. |
| 6,053,828 A | 4/2000 | Pitsenberger |
| 6,056,655 A | 5/2000 | Feeney |
| 6,077,178 A | 6/2000 | Brandt |
| 6,146,291 A | 11/2000 | Nydigger |
| 6,152,840 A | 11/2000 | Baum |
| 6,159,116 A | 12/2000 | Pitsenberger |
| 6,176,795 B1 | 1/2001 | Schullstrom |
| 6,234,922 B1 | 5/2001 | White |
| 6,238,309 B1 | 5/2001 | Sample |
| 6,248,032 B1 | 6/2001 | Filice |
| 6,251,034 B1 | 6/2001 | Eggiman |
| 6,265,333 B1 | 7/2001 | Dzenis |
| 6,280,654 B1 | 8/2001 | Digman |
| 6,287,222 B1 | 9/2001 | Pitsenberger |
| 6,322,463 B1 | 11/2001 | Forsythe |
| 6,334,824 B1 | 1/2002 | Filice |
| 6,334,825 B1 | 1/2002 | Buiatti |
| 6,344,007 B1 | 2/2002 | Feeney |
| 6,383,100 B2 | 5/2002 | Pitsenberger |
| 6,383,101 B2 | 5/2002 | Eggiman |
| 6,386,999 B2 | 5/2002 | White |
| 6,398,675 B1 | 6/2002 | Eggiman |
| 6,425,836 B1 | 7/2002 | Misono |
| 6,432,007 B1 | 8/2002 | Filice |
| 6,461,260 B1 | 10/2002 | Higginbotham |
| 6,482,114 B1 | 11/2002 | Eggiman |
| 6,497,631 B1 | 12/2002 | Fritzke |
| 6,508,731 B1 | 1/2003 | Feeney |
| 6,511,392 B1 | 1/2003 | Chohan |
| 6,530,852 B2 | 3/2003 | Rios |
| 6,533,985 B1 | 3/2003 | Smith |
| 6,634,969 B2 | 10/2003 | Forsythe |
| 6,640,200 B1 | 10/2003 | Baum |
| 6,663,517 B2 | 12/2003 | Buiatti |
| 6,702,698 B2 | 3/2004 | Eggiman |
| 6,723,012 B1 | 4/2004 | Sutherland |
| 6,723,127 B2 | 4/2004 | Ralph |
| 6,730,047 B2 | 5/2004 | Socci |
| 6,733,404 B2 | 5/2004 | Fritzke |
| 6,743,127 B2 | 6/2004 | Eggiman |
| 6,755,757 B2 | 6/2004 | Sutherland |
| 6,761,653 B1 | 7/2004 | Higginbotham |
| 6,764,419 B1 | 7/2004 | Giannetti |
| 6,767,297 B2 | 7/2004 | Hebreo |
| 6,770,002 B2 | 8/2004 | Aigotti |
| 6,776,735 B1 | 8/2004 | Bélanger |
| 6,778,915 B2 | 8/2004 | Kelly |
| 6,808,464 B1 | 10/2004 | Nguyen |
| 6,821,218 B2 | 11/2004 | Byrne |
| 6,839,453 B1 | 1/2005 | McWilliam |
| 6,866,598 B2 | 3/2005 | Giannetti |
| 6,869,372 B1 | 3/2005 | Higginbotham |
| 6,872,156 B2 | 3/2005 | Ogawa |
| 6,872,157 B2 | 3/2005 | Falone |
| 6,875,137 B2 | 4/2005 | Forsythe |
| 6,878,080 B2 | 4/2005 | Chang |
| 6,892,396 B2 | 5/2005 | Uno |
| 6,899,648 B2 | 5/2005 | Chang |
| 6,905,429 B2 | 6/2005 | Forsythe |
| 6,929,573 B1 | 8/2005 | Chang |
| 6,945,886 B2 | 9/2005 | Eggiman |
| 6,949,038 B2 | 9/2005 | Fritzke |
| 6,969,330 B1 | 11/2005 | Meeker |
| 6,991,551 B2 | 1/2006 | Tolentino |
| 6,994,641 B2 | 2/2006 | Hebreo |
| 6,997,826 B2 | 2/2006 | Sutherland |
| 7,000,252 B1 | 2/2006 | Tobin |
| 7,006,947 B2 | 2/2006 | Tryon, III |
| 7,008,339 B2 * | 3/2006 | Sutherland ............ A63B 59/54 473/566 |
| 7,011,588 B2 | 3/2006 | Fritzke |
| 7,014,580 B2 | 3/2006 | Forsythe |
| 7,017,427 B1 | 3/2006 | Vacek |
| 7,027,623 B2 | 4/2006 | McWilliam |
| 7,033,291 B1 | 4/2006 | Meeker |
| 7,044,871 B2 | 5/2006 | Terrance |
| 7,052,419 B2 | 5/2006 | Chang |
| 7,087,296 B2 | 8/2006 | Porter |
| 7,097,578 B2 | 8/2006 | Guenther |
| 7,098,891 B1 | 8/2006 | Pryor |
| 7,110,951 B1 | 9/2006 | Lemelson |
| 7,115,054 B2 | 10/2006 | Giannetti |
| 7,128,670 B2 | 10/2006 | Souders |
| 7,140,987 B2 | 11/2006 | Davis |
| 7,163,475 B2 | 1/2007 | Giannetti |
| 7,175,552 B2 | 2/2007 | Fritzke |
| 7,207,907 B2 | 4/2007 | Guenther |
| 7,210,172 B2 | 5/2007 | Adams, Jr. |

(56) References Cited

U.S. PATENT DOCUMENTS

| | | |
|---|---|---|
| 7,232,388 B2 | 6/2007 | Sutherland |
| D547,814 S | 7/2007 | Sims |
| 7,300,365 B2 | 11/2007 | Taylor |
| 7,320,653 B2 | 1/2008 | Fitzgerald |
| 7,331,885 B2 | 2/2008 | Thomas |
| 7,334,488 B1 | 2/2008 | Vacek |
| 7,361,107 B2 | 4/2008 | Giannetti |
| 7,364,520 B2 | 4/2008 | Chauvin |
| 7,377,866 B2 | 5/2008 | Nguyen |
| 7,384,354 B2 | 6/2008 | Giannetti |
| 7,392,717 B1 | 7/2008 | Vacek |
| 7,397,851 B2 | 7/2008 | Roman |
| 7,410,433 B2 | 8/2008 | Guenther |
| 7,419,446 B2 | 9/2008 | Van Nguyen |
| 7,431,655 B2 | 10/2008 | McCarty |
| 7,438,656 B2 | 10/2008 | Davis |
| 7,442,134 B2 | 10/2008 | Giannetti |
| 7,442,135 B2 | 10/2008 | Giannetti |
| 7,448,971 B1 | 11/2008 | Smalley |
| 7,527,570 B2 | 5/2009 | Giannetti |
| 7,572,197 B2 | 8/2009 | Chauvin |
| 7,578,758 B2 | 8/2009 | Thomas |
| 7,585,235 B2 | 9/2009 | Misono |
| 7,651,420 B1 | 1/2010 | Gaff |
| 7,670,238 B2 | 3/2010 | Esquerra |
| 7,699,725 B2 | 4/2010 | McNamee |
| 7,714,849 B2 | 5/2010 | Pryor |
| 7,744,497 B2 | 6/2010 | Phelan, Jr. |
| 7,749,114 B2 | 7/2010 | Thouin |
| 7,749,115 B1 * | 7/2010 | Cruz ............ A63B 60/00 473/566 |
| 7,767,876 B2 | 8/2010 | Davis |
| 7,781,640 B2 | 8/2010 | Davis |
| 7,837,579 B2 * | 11/2010 | Bhatt ............ A63B 59/51 473/566 |
| 7,850,554 B2 | 12/2010 | Burger |
| 7,857,719 B2 | 12/2010 | Giannetti |
| 7,867,114 B2 | 1/2011 | Sutherland |
| 7,877,820 B2 | 2/2011 | Landi |
| 7,896,763 B2 | 3/2011 | Giannetti |
| 7,906,191 B2 | 3/2011 | Pratt |
| 7,914,404 B2 | 3/2011 | Giannetti |
| 7,955,200 B1 | 6/2011 | Cruz |
| 7,973,773 B2 | 7/2011 | Pryor |
| 7,980,970 B2 | 7/2011 | Watari |
| 7,985,149 B2 | 7/2011 | Watari |
| 7,993,223 B2 | 8/2011 | Watari |
| 7,993,249 B1 | 8/2011 | Fassl |
| 8,013,843 B2 | 9/2011 | Pryor |
| 8,029,391 B2 | 10/2011 | McNamee |
| 8,044,941 B2 | 10/2011 | Pryor |
| 8,062,154 B2 | 11/2011 | Burger |
| 8,068,100 B2 | 11/2011 | Pryor |
| 8,072,440 B2 | 12/2011 | Pryor |
| 8,092,322 B1 | 1/2012 | Smallcomb |
| 8,170,095 B2 | 5/2012 | Roman |
| 8,182,377 B2 | 5/2012 | Chuang |
| 8,197,365 B2 * | 6/2012 | Tokieda ............ A63B 59/51 473/566 |
| 8,197,366 B2 | 6/2012 | Chauvin |
| 8,206,250 B1 | 6/2012 | Cruz |
| 8,226,505 B2 * | 7/2012 | Burger ............ A63B 60/06 473/566 |
| 8,228,305 B2 | 7/2012 | Pryor |
| 8,277,343 B2 | 10/2012 | Chang |
| 8,282,516 B2 | 10/2012 | Chauvin |
| 8,298,102 B2 | 10/2012 | Chauvin |
| 8,317,640 B1 | 11/2012 | Cruz |
| 8,371,154 B2 | 2/2013 | Brandt |
| 8,376,881 B2 | 2/2013 | Chuang |
| 8,416,847 B2 | 4/2013 | Roman |
| 8,427,449 B2 | 4/2013 | Pryor |
| 8,435,143 B2 | 5/2013 | Vander Pol |
| 8,449,412 B2 | 5/2013 | Edwin |
| 8,467,133 B2 | 6/2013 | Miller |
| 8,472,120 B2 | 6/2013 | Border |
| 8,475,304 B2 | 7/2013 | Ou |
| 8,477,425 B2 | 7/2013 | Border |
| 8,480,519 B2 | 7/2013 | Chauvin |
| 8,482,859 B2 | 7/2013 | Border |
| 8,488,246 B2 | 7/2013 | Border |
| 8,495,518 B2 | 7/2013 | Boden |
| 8,506,429 B2 | 8/2013 | Chauvin |
| 8,512,174 B2 | 8/2013 | Epling |
| 8,512,175 B2 | 8/2013 | Epling |
| 8,512,176 B1 * | 8/2013 | Mathew ............ A63B 60/00 473/567 |
| 8,602,924 B2 | 12/2013 | Shindome |
| 8,613,679 B2 | 12/2013 | Zhesterova |
| 8,632,428 B2 | 1/2014 | Burger |
| 8,702,542 B2 | 4/2014 | Parenti |
| 8,708,845 B2 | 4/2014 | Chuang |
| 8,715,118 B2 | 5/2014 | Epling |
| 8,727,917 B2 | 5/2014 | Vander Pol |
| 8,734,274 B1 | 5/2014 | Hochberg |
| 8,752,419 B2 | 6/2014 | Brandt |
| 8,771,114 B2 | 7/2014 | Markovich |
| 8,795,108 B2 | 8/2014 | Chauvin |
| 8,804,101 B2 | 8/2014 | Spagnolia |
| 8,814,691 B2 | 8/2014 | Haddick |
| 8,821,322 B1 | 9/2014 | Jorgens |
| 8,845,462 B2 | 9/2014 | Chung |
| 8,852,037 B2 | 10/2014 | Epling |
| 8,858,373 B2 | 10/2014 | Epling |
| 8,894,518 B2 | 11/2014 | Chung |
| 8,944,939 B2 | 2/2015 | Clark |
| 8,964,298 B2 | 2/2015 | Haddick |
| 8,979,682 B2 | 3/2015 | Chuang |
| 8,992,352 B1 | 3/2015 | Lindsay |
| 9,005,056 B2 | 4/2015 | Pegnatori |
| 9,039,548 B2 | 5/2015 | Sams, III |
| 9,067,109 B2 | 6/2015 | Epling |
| 9,097,890 B2 | 8/2015 | Miller |
| 9,097,891 B2 | 8/2015 | Border |
| 9,101,810 B2 | 8/2015 | Carlson |
| 9,128,281 B2 | 9/2015 | Osterhout |
| 9,129,295 B2 | 9/2015 | Border |
| 9,134,534 B2 | 9/2015 | Border |
| 9,138,625 B2 | 9/2015 | Chung |
| 9,149,697 B2 | 10/2015 | Epling |
| 9,182,596 B2 | 11/2015 | Border |
| 9,186,562 B1 | 11/2015 | Mathur |
| 9,186,563 B2 | 11/2015 | Burger |
| 9,186,564 B2 | 11/2015 | Parenti |
| 9,211,460 B2 | 12/2015 | Slater |
| 9,220,962 B2 | 12/2015 | Van Nguyen |
| 9,223,134 B2 | 12/2015 | Miller |
| 9,229,227 B2 | 1/2016 | Border |
| 9,233,294 B1 | 1/2016 | Coyle |
| 9,238,163 B2 | 1/2016 | Slater |
| 9,242,155 B1 | 1/2016 | Lindsay |
| 9,242,156 B2 | 1/2016 | Goodwin |
| 9,248,355 B2 | 2/2016 | Long |
| 9,257,054 B2 | 2/2016 | Coza |
| 9,285,589 B2 | 3/2016 | Osterhout |
| 9,289,665 B2 | 3/2016 | Muller |
| 9,308,424 B2 | 4/2016 | Thurman |
| 9,329,689 B2 | 5/2016 | Osterhout |
| 9,341,843 B2 | 5/2016 | Border |
| 9,366,862 B2 | 6/2016 | Haddick |
| 9,387,383 B2 | 7/2016 | Hou |
| 9,427,640 B2 | 8/2016 | Davis |
| 9,457,247 B2 | 10/2016 | Fitzgerald |
| 9,457,248 B2 | 10/2016 | Long |
| 9,463,364 B2 | 10/2016 | Chuang |
| 9,468,823 B2 | 10/2016 | Mitton |
| 9,486,680 B2 | 11/2016 | Burger |
| 9,498,690 B2 | 11/2016 | Carlson |
| 9,504,414 B2 | 11/2016 | Coza |
| 9,504,891 B1 | 11/2016 | Chen |
| 9,511,267 B2 | 12/2016 | Thurman |
| 9,744,416 B2 | 8/2017 | Chuang |
| 10,456,639 B2 | 10/2019 | Leinert |
| 10,507,368 B2 * | 12/2019 | Kikuchi ............ A63B 59/58 |

(56) References Cited

U.S. PATENT DOCUMENTS

| | | |
|---|---|---|
| 10,646,761 B2 * | 5/2020 | Early .................... A63B 59/50 |
| 10,940,377 B2 | 3/2021 | Chauvin |
| 11,013,967 B2 | 5/2021 | Chauvin |
| 11,389,703 B2 * | 7/2022 | Yamashita ................ B32B 1/00 |
| 2002/0098924 A1 | 7/2002 | Houser |
| 2004/0132563 A1 | 7/2004 | Giannetti |
| 2004/0176197 A1 | 9/2004 | Sutherland |
| 2004/0209716 A1 | 10/2004 | Vacek |
| 2004/0224801 A1 | 11/2004 | Forsythe |
| 2005/0143203 A1 | 6/2005 | Souders |
| 2005/0176531 A1 | 8/2005 | Fitzgerald |
| 2006/0247079 A1 | 11/2006 | Sutherland |
| 2007/0202974 A1 | 8/2007 | Giannetti |
| 2007/0205201 A1 | 9/2007 | Cundiff |
| 2009/0065299 A1 | 3/2009 | Vito |
| 2009/0181813 A1 | 7/2009 | Giannetti |
| 2009/0312126 A1 | 12/2009 | Totino |
| 2013/0045823 A1 | 2/2013 | Sublett, Sr. |
| 2014/0190623 A1 * | 7/2014 | Bradford ................ A63B 60/14 |
| | | 428/80 |
| 2014/0213395 A1 | 7/2014 | Chuang |
| 2017/0252617 A1 | 9/2017 | Kardos |
| 2018/0154229 A1 | 6/2018 | Osborne |
| 2019/0022483 A1 | 1/2019 | Chauvin |
| 2019/0054357 A1 | 2/2019 | Epling |
| 2019/0321705 A1 * | 10/2019 | Hunt .................... A63B 60/002 |
| 2019/0329109 A1 * | 10/2019 | Hsu .................... A63B 69/0002 |
| 2024/0050823 A1 * | 2/2024 | Mahoney ............... A63B 60/16 |

OTHER PUBLICATIONS

Fibre Reinforced Plastic, "Sandwich Composite and Core Material", available at http://www.fibre-reinforced-plastic.com/2010/12/sandwich-composite-and-core-material.html, dated Dec. 12, 2010, website visited Jun. 18, 2018.

United States Patent and Trademark Office, Search Report and Written Opinion for PCT/US10/62083, mailed Apr. 6, 2011.

* cited by examiner

COMPOSITE BALL BATS WITH TRANSVERSE INTERLAMINAR INTERFACES

BACKGROUND

Composite ball bats for baseball or softball are often made with one or more layers or plies of composite laminate material. In an assembled composite bat, the composite layers are often concentrically arranged, such that an inner layer forms an inner portion of a bat wall while an outer layer forms an outer portion of a bat wall.

In a typical composite bat formed with multiple layers of composite laminate material, the volume of matrix material (sometimes in the form of resin) is higher between the layers (in the interlaminar interfaces) than in the laminate layers themselves. These areas, and other areas in which the matrix material makes up much or all of the assembly, are typically referred to as "resin-rich" areas. Resin-rich areas tend to be weaker than areas reinforced with fibers. In a typical composite ball bat (and other composite structures), there may be resin-rich veins running axially (along the bat's length) within the bat wall. Designers of composite bats consider these areas when determining the overall strength of the bat. For example, designers may analyze the interlaminar shear strength of an assembled bat.

During repeated use of composite bats, the matrix or resin of the composite material tends to crack, and the fibers tend to stretch or break. Sometimes the composite material develops interlaminar failures, which involve plies or layers of the composite materials separating or delaminating from each other along a failure plane between the layers in the interlaminar interface. For example, the plies may separate along the resin-rich areas. This "break-in" reduces stiffness and increases the elasticity or trampoline effect of a bat, which tends to temporarily increase bat performance. Typically, the separation of the plies along the resin-rich areas results in fracturing between the plies, but the fibers in the plies generally resist cracking through the thickness of the plies.

As a bat breaks in, and before it fully fails (for example, before the bat wall experiences a through-thickness failure), it may exceed performance limitations specified by a governing body, such as limitations related to batted ball speed. Some such limitations are specifically aimed at regulating the performance of a bat that has been broken in from normal use, such as BBCOR ("Bat-Ball Coefficient of Restitution") limitations.

Some players choose to intentionally break in composite bats to increase performance. Intentional break-in processes may be referred to as accelerated break-in (ABI), and may include techniques such as "rolling" a bat or otherwise compressing it, or generating hard hits to the bat with an object other than a ball. Such processes tend to be more abusive than break-in during normal use, and they exploit the relatively weak interlaminar shear strength of resin-rich areas of composite ball bats in an attempt to increase batted ball speed. Accordingly, sports governing bodies often require composite ball bats to meet certain standards even after ABI occurs to limit the increase in performance from use and abuse of a composite bat.

SUMMARY

Representative embodiments of the present technology include a ball bat having a continuous tape of fiber material wrapped around the longitudinal axis in a helix extending along the longitudinal axis. Interlaminar interfaces between adjacent turns of the tape are oriented obliquely relative to the longitudinal axis. In some embodiments, the ball bat includes a preform structure and the tape is wrapped around the preform structure. In some embodiments, the ball bat includes a flared element on the preform structure, the flared element having an angled surface. An end of the continuous tape may be positioned on the angled surface. An outer skin may be positioned radially outwardly from the tape to generally cover the tape. In some embodiments, a method of making a ball bat includes attaching a first end of a fiber tape to a flared element on a preform structure or a mandrel and wrapping the fiber tape around the preform structure or mandrel in a helix extending along the longitudinal axis of the preform structure or mandrel.

Other features and advantages will appear hereinafter. The features described herein can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to composite ball bats with transverse interlaminar interfaces, and associated systems and methods. Various embodiments of the technology will now be described. The following description provides specific details for a thorough understanding and enabling description of these embodiments. One skilled in the art will understand, however, that the invention may be practiced without many of these details. Additionally, some well-known structures or functions, such as those common to ball bats and composite materials, may not be shown or described in detail to avoid unnecessarily obscuring the relevant description of the various embodiments. Accordingly, embodiments of the present technology may include additional elements or exclude some of the elements described below with reference to FIGS. 1-7, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

For purposes of the present disclosure, a first element that is positioned "toward" an end of a second element is positioned closer to that end of the second element than to a middle or mid-length location of the second element.

Specific details of several embodiments of the present technology are described herein with reference to ball bats. Embodiments of the present technology can be used in baseball, softball, cricket, or other similar sports in which an implement hits a ball.

Figure 1:
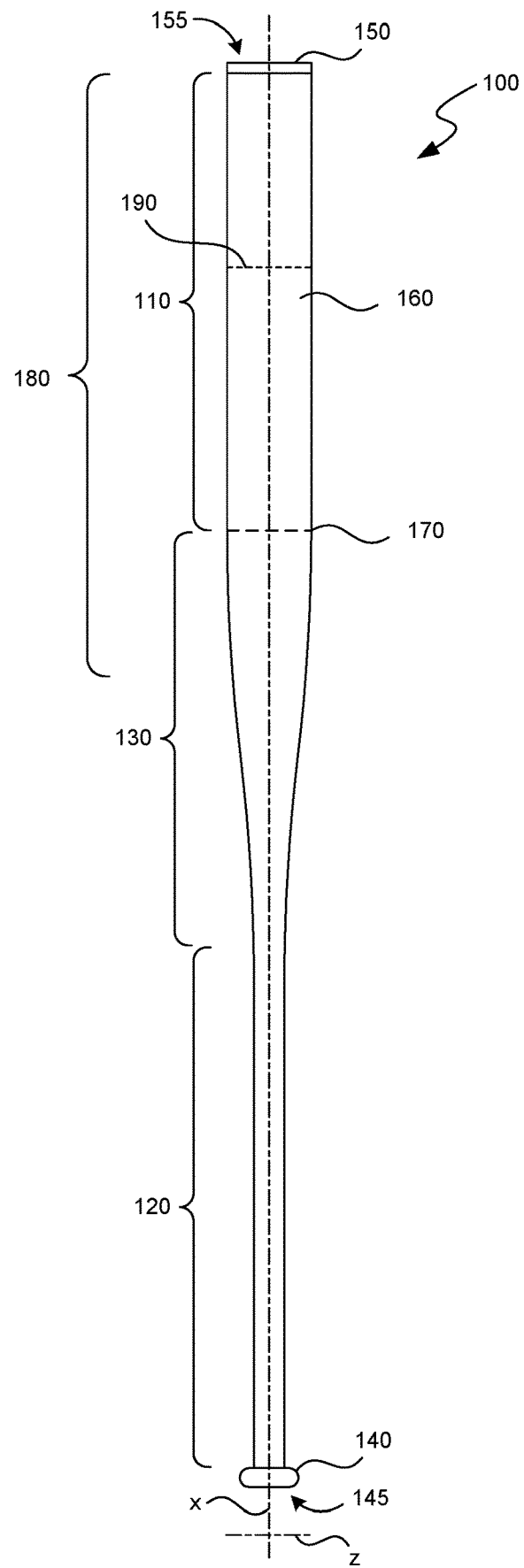
FIG. 1 illustrates a side view of a ball bat configured in accordance with embodiments of the present technology.

As shown in FIG. 1, a baseball or softball bat 100, hereinafter collectively referred to as a "ball bat" or "bat," includes a barrel portion 110, a handle portion 120, and a tapered section 130 joining the handle portion 120 to the barrel portion 110 along a longitudinal axis x. The tapered section 130 transitions the larger diameter of the barrel portion 110 to the narrower diameter of the handle portion 120. The tapered section 130 may include parts of the barrel portion 110 or the handle portion 120, such that the barrel portion 110 is attached to, or continuous with, the handle portion 120. The handle portion 120 optionally includes a knob 140 or similar structure positioned at a proximal end 145 of the bat 100. An optional end cap 150 or other suitable plug may close off the barrel portion 110 at a distal end 155 of the bat 100 (for purposes of this disclosure, the "distal end" is the end of an embodiment farthest from a user). The barrel portion 110 may include a non-tapered or straight section 160 extending between the end cap 150 and a location 170.

The interior of the bat 100 is optionally hollow, allowing the bat 100 to be relatively lightweight so that ball players may generate substantial bat speed when swinging the bat 100. A hitting surface or ball striking area 180 of the bat 100 typically extends throughout the length of the barrel portion 110, and may extend partially into the tapered section 130 of the bat 100. The bat 100 generally includes a "sweet spot" 190, which is the impact location where the transfer of energy from the bat 100 to a ball is generally maximal, while the transfer of energy to a player's hands is generally minimal. The sweet spot 190 is typically located near the bat's center of percussion (COP), which may be determined by the ASTM F2398-11 Standard. For ease of measurement and description in the present application, the sweet spot 190 described herein coincides with the bat's COP.

The proportions of the bat 100, such as the relative sizes of the barrel portion 110, the handle portion 120, and the tapered section 130, are not drawn to scale and may have any relative proportions suitable for use in a ball bat. Accordingly, the bat 100 may have any suitable dimensions. For example, the bat 100 may have an overall length of 20 to 40 inches, or 26 to 34 inches. The overall barrel portion 110 diameter may be 2.0 to 3.0 inches, or 2.25 to 2.75 inches. Typical ball bats have barrel diameters of 2.25, 2.625, or 2.75 inches. Bats having various combinations of these overall lengths and barrel diameters, or any other suitable dimensions, are contemplated herein. The specific preferred combination of bat dimensions is generally dictated by the user of the ball bat 100, and may vary greatly among users. For purposes of orientation and context for the description herein, FIG. 1 also illustrates a radial z-axis. The z-axis is orthogonal to the longitudinal x-axis and extends radially through the wall thickness of the bat 100.

Components of the ball bat 100 may be constructed from one or more composite or metallic materials. Some examples of suitable composite materials include laminate layers or plies reinforced with fibers of carbon, glass, graphite, boron, aramid (such as Kevlar®), ceramic, or silica (such as Astroquartz®). Suitable metallic materials include aluminum, titanium, or another suitable metallic material.

For convenience of description and to assist the reader with understanding embodiments of the present technology, some aspects of construction of a ball bat 100 are first described below, followed by descriptions of embodiments of ball bats that may be formed using aspects of construction techniques according to the present technology. Methods of making ball bats according to embodiments of the present technology are also disclosed.

Figure 2:
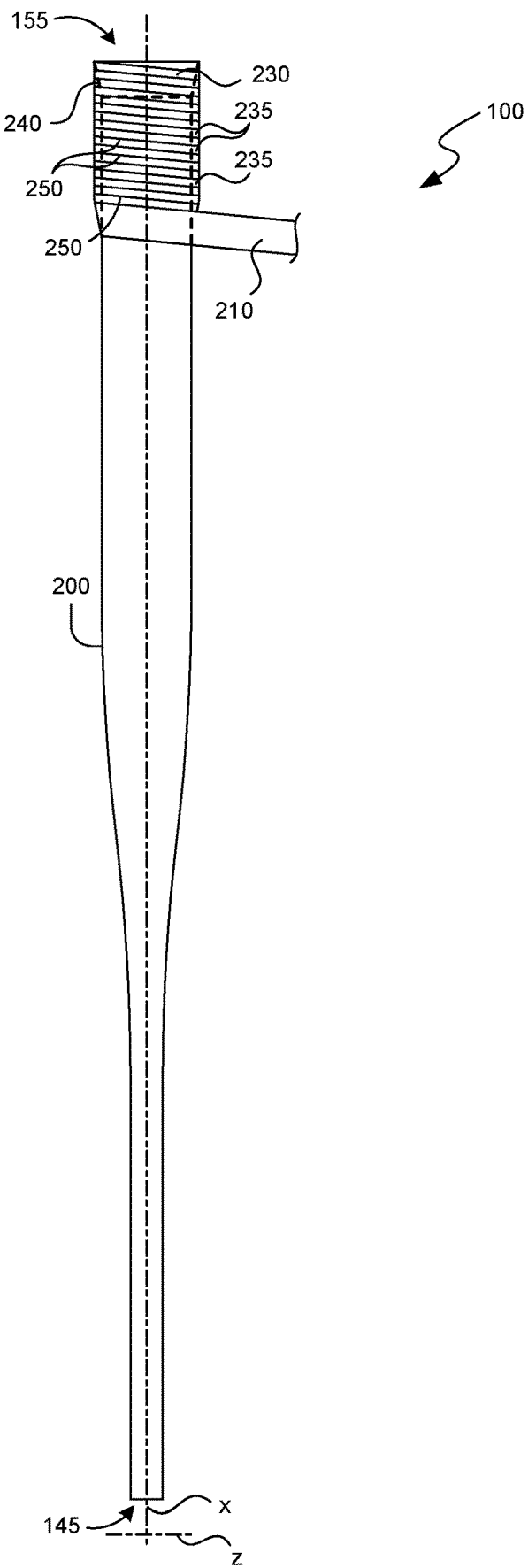
FIG. 2 illustrates a side view of a partially-assembled ball bat configured in accordance with embodiments of the present technology.

FIG. 2 illustrates a side view of a partially assembled ball bat 100 configured in accordance with embodiments of the present technology. In some embodiments, the ball bat 100 includes a preform structure 200 and a fiber tape 210 wrapped around at least a portion of the preform structure 200. The preform structure 200 extends along the longitudinal axis x and may be generally shaped like a finished ball bat 100 (for example, it may have a barrel shape, a handle shape, and a tapered section shape). The preform structure 200 may be formed with composite laminate material or other suitable composite materials.

In some embodiments, a flared element 230 (illustrated as being beneath the fiber tape 210) is positioned on, or integral with, the preform structure 200 toward the distal end 155. The flared element 230 has a surface 240 (also illustrated as being beneath the fiber tape 210) that diverges or tapers away from the longitudinal axis x as it extends away from the proximal end 145 and toward the distal end 155. As explained in detail below, the flared element 230 may be formed as a discrete wedge element (such as a ring having a wedge-shaped cross-section) permanently or temporarily attached to the distal end 155 of the preform structure 200. In some embodiments in which the flared element 230 is integral with the preform structure 200, it may be a flared portion of the preform structure 200 having the characteristics of the flared element 230.

The surface 240 is angled transverse to the longitudinal axis x. The flared element 230 and the surface 240 provide a starting point for wrapping the fiber tape 210 around the preform structure 200 in a helix that extends along the longitudinal axis x. Because the surface 240 of the flared element 230 is angled relative to the remainder of the preform structure 200, consecutive turns (wraps) of the fiber tape 210 form overlapping layers 235 of the fiber tape 210 that are also angled (oriented transversely) relative to the preform structure 200. Likewise, interlaminar interfaces 250 between consecutive turns or layers 235 are oriented transversely relative to the longitudinal axis x and to the preform structure 200.

The angled layers 235 of fiber tape 210 form a portion of the thickness of a wall of the ball bat 100. Accordingly, a ball bat 100 configured in accordance with embodiments of the present technology includes a barrel wall with interlaminar interfaces 250 that are orthogonal or transverse to the x-axis of the bat 100, which yields components that extend at least partially in a radial or z-direction, and also positions fibers of the fiber tape 210 at least partially along a radial or z-direction. The angled nature of the layers 235, the interlaminar interfaces 250, and the fibers within the fiber tape 210 provides an improved balance of hoop strength and axial strength in the barrel wall relative to existing composite bat technologies that use concentric composite layers (in which the interlaminar interfaces extend along the x-axis). Manufacturing the angled components of embodiments of the present technology is advantageously relatively simple at least because it involves wrapping a single continuous fiber tape 210 around the preform 200.

The fiber tape 210 is a tape (strip) of fiber material (such as carbon fiber, fiberglass, aramid, flax, or other fibers suitable for use in composite materials), which may or may not include a resin or matrix material. For example, the fiber tape 210 may be a prepreg material (uncured material pre-impregnated with resin material or other suitable composite matrix materials) that is manipulated into position before curing, either co-curing with the preform structure 200 or curing at a different time than the preform structure 200.

In some embodiments, the fiber tape 210 may be a fiber material without resin or matrix material and it may have the resin or matrix applied and cured through known composite manufacturing techniques. In some embodiments, the fiber tape 210 may include unidirectional fiber tape. The fiber tape 210 may include fiber angles (the angle of the fiber within the tape relative to the length of the tape) of 45 degrees, or other suitable angles. Fiber angles of approximately 45 degrees provide resistance to fraying when wrapping around the preform 200. In some embodiments, the fiber tape 210 may include braided fiber tape. Generally, composite materials forming the fiber tape 210 and the preform structure 200 may be conventional composite materials.

Figure 3:
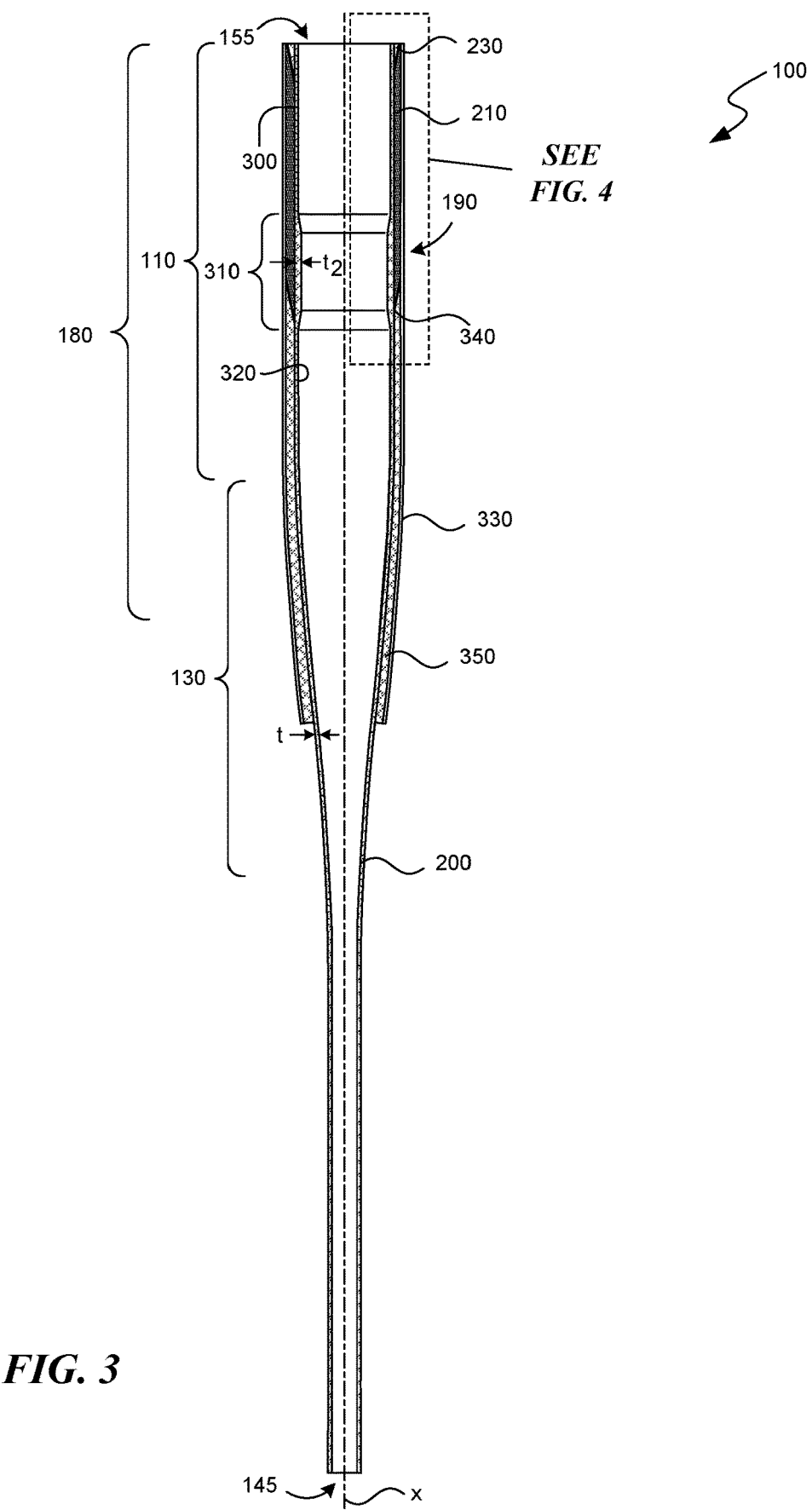
FIG. 3 illustrates a side cross-sectional view of a portion of the ball bat shown in FIG. 2.
Figure 4:
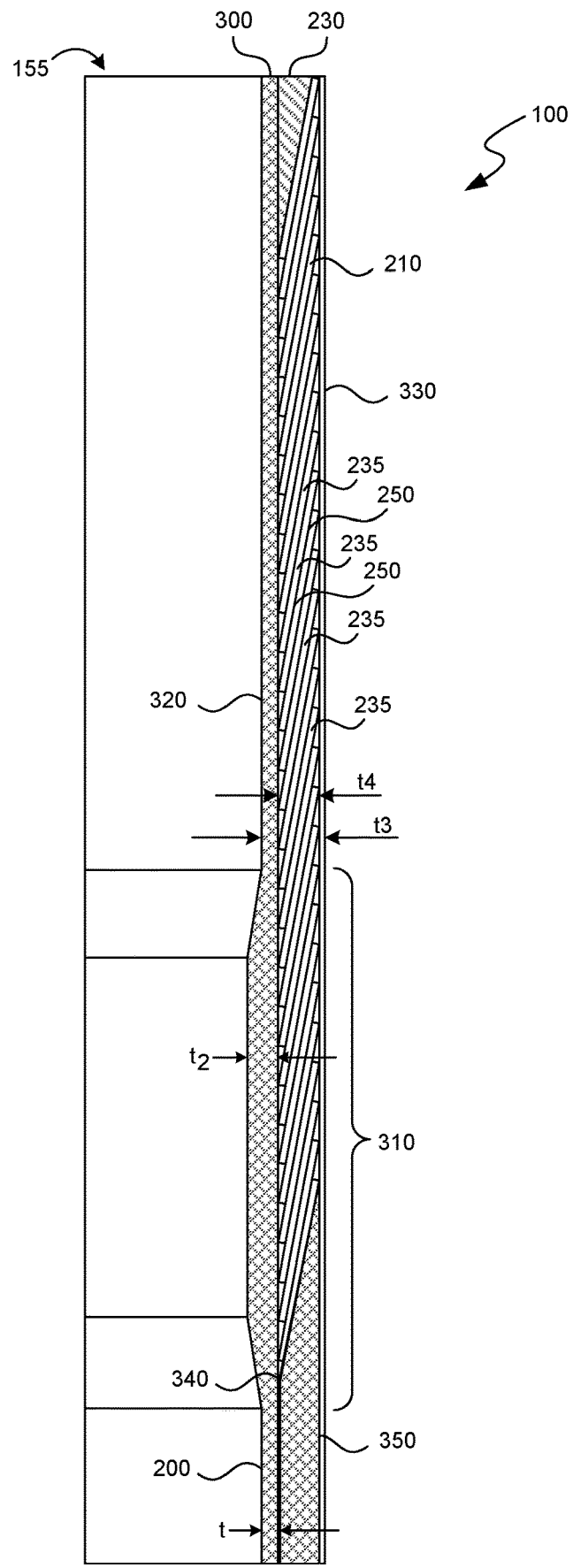
FIG. 4 is a detailed view of the outlined section labeled "SEE FIG. 4" in FIG. 3.

FIG. 3 illustrates a side cross-sectional view of a portion of the ball bat 100, configured in accordance with embodiments of the present technology. FIG. 4 is a detailed view of the outlined section labeled "SEE FIG. 4" in FIG. 3. With reference to both FIGS. 3 and 4, the preform structure 200 may be formed with composite laminate material or other suitable composite materials. In some embodiments, the preform structure 200 comprises a plurality of concentric layers of composite laminate material forming a preform wall 300.

In some embodiments, the preform wall 300 has a uniform thickness t along its length. In other embodiments, the preform wall 300 has non-uniform or varying thickness along its length, such as a section 310 where the preform wall 300 has a greater thickness t2 than the remaining thickness t of the preform wall 300. The section 310 may include the inner surface 320 of the preform wall 310 extending radially inwardly toward the longitudinal axis x, and it may optionally include tapering between thicknesses t and t2. The section 310 may be located at or adjacent to the sweet spot 190. In some embodiments that include a preform wall 300 which has variable or non-uniform thickness along its length, an overall thickness t3 of the barrel wall may be maintained regardless of the preform wall thickness by adjusting the overlap of the fiber tape 210 (the thickness t3 includes: the radial thickness of the preform wall 300, such as the thickness t or t2; the radial thickness t4 of the fiber tape 210 when it is wrapped around the preform wall 300; and the radial thickness of the outer skin 330 described below, if any). For example, less overlap of wraps of tape 210 can compensate for a thicker preform wall, or more overlap can compensate for a thinner preform wall, to maintain desired or consistent wall thickness.

In some embodiments, the fiber tape 210 is wrapped around the preform structure 200 in a helix that extends through the full striking area 180 of the ball bat 100. In some embodiments, the helix may extend only through part of the striking area 180, such as only along a full length of the barrel portion 110. In some embodiments, as shown in FIGS. 3 and 4, the helix of fiber tape 210 may extend through only part of the striking area 180 or along only a portion of the longitudinal axis x of the ball bat. For example, the helix of fiber tape 210 may extend from near (such as within one to three inches of) the sweet spot 190 to the distal end 155. In some embodiments, the fiber tape 210 is positioned to extend from the distal end 155 toward the proximal end 145 by three to ten inches, depending in part on the size of the ball bat 100. In some embodiments, the fiber tape 210 extends along a full length of the ball bat 100. A single fiber tape 210 wrapped in a helix that is positioned to extend along the full striking area 180 tends to provide increased durability because there is not an area of discontinued fibers of the tape (where the tape ends) within the striking area 180. A single fiber tape 210 wrapped in a helix along the full striking area 180 also tends to be easier to manufacture than shorter tape (a shorter helix) or a plurality of tapes.

The flared element 230 may be a discrete ring-shaped wedge element, although, as explained above, the flared element 230 may be integral to the preform structure 200. In some embodiments, the flared element 230 is formed with the same material as the preform structure 200. In other embodiments, the flared element 230 is made of wood, plastic (such as thermoplastic polyurethane), metal, foam, composite material, or another material suitable for providing the angled aspect of the flared element 230 and suitable for receiving an end of the fiber tape 210.

In some embodiments, the wrapped fiber tape 210 forms the outermost surface of the ball bat 100 (setting aside paint or indicia). In other embodiments, the ball bat 100 includes an outer skin 330 positioned over the wrapped fiber tape 210 to form the outermost surface of the ball bat 100 (setting aside paint or indicia). The outer skin 330 forms an exterior cover that may provide a smooth outer surface or it may further modify the structural characteristics of the bat 100. For example, an outer skin 330 may add durability, axial stiffness, and improved feel relative to embodiments in which there is no outer skin 330.

Because the helix of fiber tape 210 may extend only a partial length of the ball bat along the longitudinal axis x (for example, from the distal end 155 to a tape end 340), there may be an external or surface shape discontinuity adjacent to the tape end 340. To avoid such a shape discontinuity, in some embodiments, the bat 100 includes one or more composite layers 350 (such as composite laminate layers) positioned on the preform 200 or integral with the preform 200 adjacent to the tape end 340 along the longitudinal axis x. The one or more composite layers 350 may extend along the longitudinal axis x between the tape end 340 and a location within the tapered section 130, or the one or more composite layers 350 may extend all the way to the proximal end 145 of the ball bat 100. In some embodiments, the outer skin 330 is also positioned over the one or more composite layers 350.

Although FIGS. 3 and 4 show the flared element 230 positioned at or toward the distal end 155, in some embodiments, the flared element 230 may be positioned elsewhere along the length of the ball bat 100.

Figure 5:
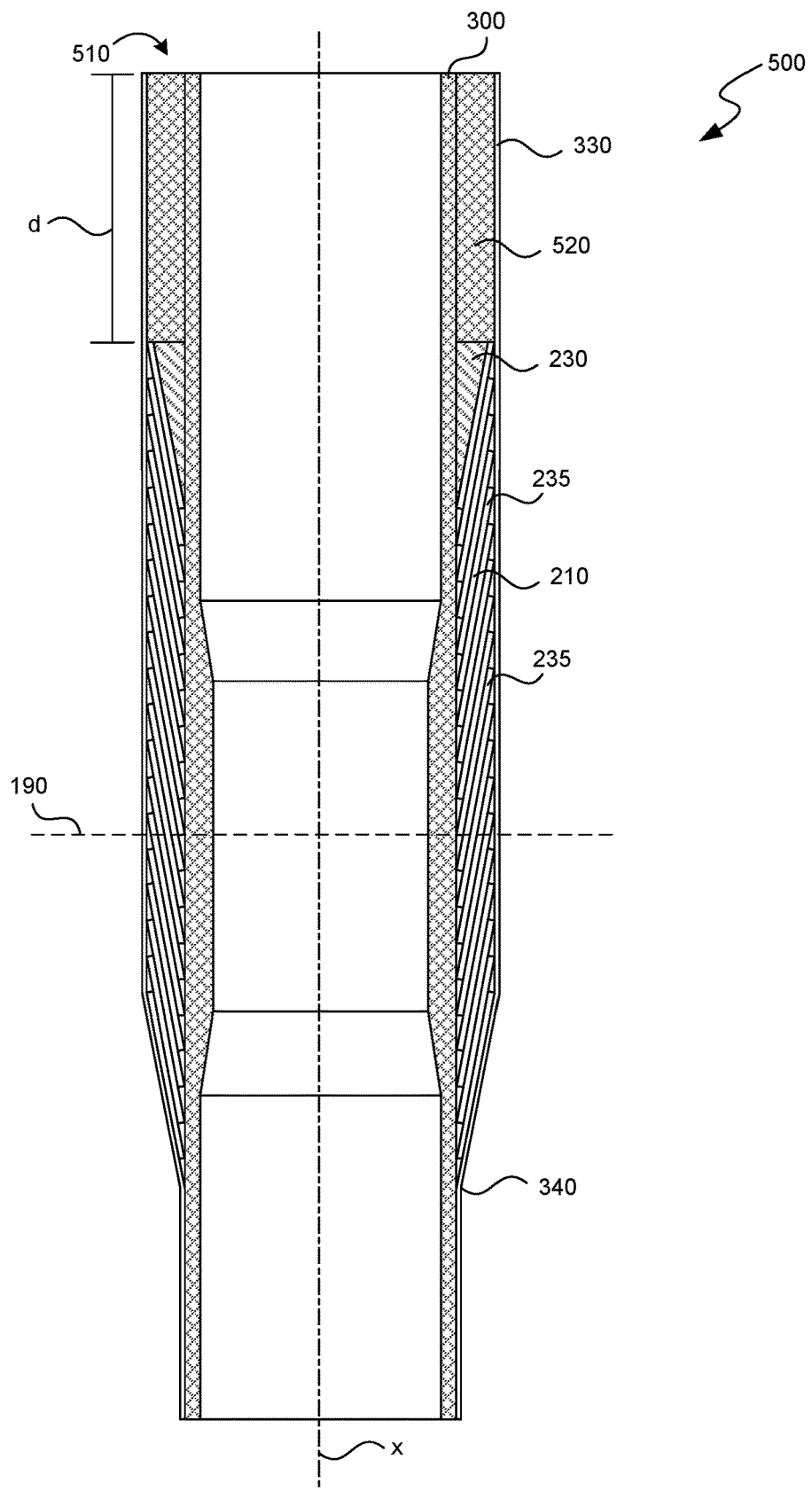
FIG. 5 illustrates a side cross-sectional view of a portion of a ball bat configured in accordance with further embodiments of the present technology.

For example, FIG. 5 illustrates a side cross-sectional view of a portion of a ball bat 500 configured in accordance with further embodiments of the present technology, in which the flared element 230 is positioned at a distance d from the distal end 510 of the bat 500. The ball bat 500 may be similar to the ball bat 100 described above, except that the fiber tape 210 does not extend to the distal end 510. Instead, for example, one or more concentric composite laminate layers 520 that extend generally parallel to the x-axis may be positioned between the fiber tape 210 (or the flared element 230) and the distal end 510. Accordingly, in various embodiments, the fiber tape 210 may form any suitable portion of a ball bat, such as some or all of the barrel portion 110, some or all of the handle portion 120, or some or all of the tapered section 130 (see FIG. 1). In the embodiment shown in FIG. 5, the fiber tape 210 may extend from a location between the sweet spot 190 and the distal end 510 (the location being spaced apart from the distal end 510) to a location between the sweet spot 190 and the proximal end 145 (see FIG. 1) of a ball bat.

Generally, in embodiments in which the fiber tape 210 does not span a full length of a ball bat, other composite material may be positioned adjacent to the fiber tape 210 (such as the one or more composite laminate layers 350 between the fiber tape 210 and the proximal end 145 of the bat 100, as shown in FIG. 3, or the one or more composite laminate layers 520 between the fiber tape 210 and the distal end 510 of the bat 500 as shown in FIG. 5, or other combinations or arrangements of fiber tape 210 and composite laminate layers).

Figure 6:
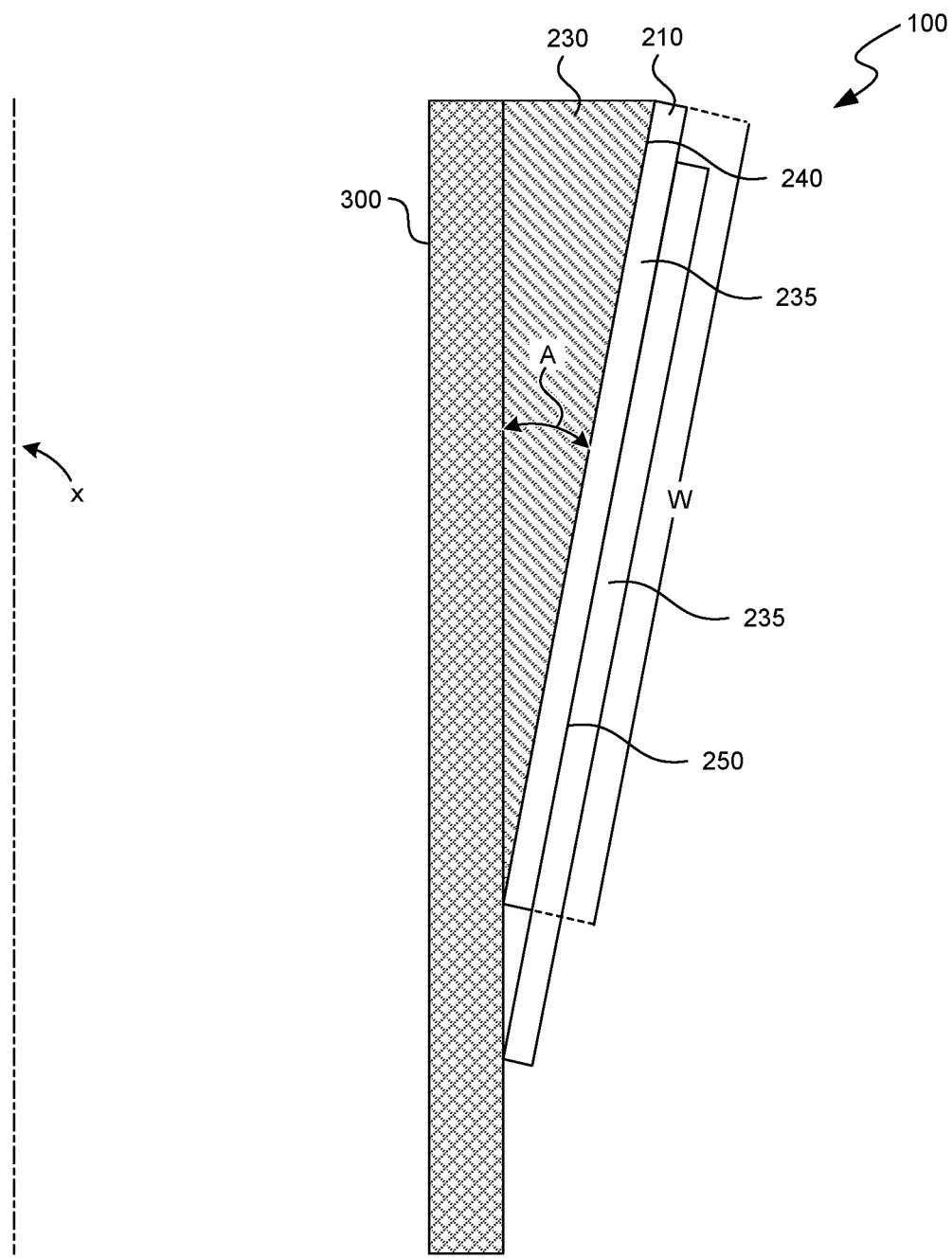
FIG. 6 is a schematic cross-sectional view of a wall of a preform structure, a flared element, and a single turn or layer of fiber tape, in accordance with embodiments of the present technology.

FIG. 6 is a schematic cross-sectional view of the preform wall 300, the flared element 230, and two layers 235 of fiber tape 210 (formed by at least one wrap or turn of the helix of fiber tape 210). An angle A is illustrated in FIG. 6 to represent the angle between the surface 240 and the preform wall 300. Because the preform wall 300 is generally parallel to the x-axis at the location of the flared element 230, the angle A also represents the angle between the surface 240 and the x-axis. Likewise, the angle A represents the angle between the layers 235 of fiber tape 210 and the x-axis, as well as the angle between the interlaminar interface 250 and the x-axis. The angle A may be between 1 and 90 degrees.

A 90-degree angle A would orient the interfaces 250 between the layers 235 to be perpendicular to the x-axis. Such a 90-degree angle A, however, presents manufacturing challenges and may reduce durability and axial strength. For example, as the angle A approaches 90 degrees, the tape 210 may stretch or wrinkle on its sides more than it would at lesser angles, because opposite sides of the tape 210 would be forced to have different radial locations from each other. Although the tape 210 may be pleated at its outer radius to adjust for such stretching or wrinkling, pleating reduces the strength of the tape 210 and increases complexity in the manufacturing process. Generally, oblique angles (greater than one degree and less than 90 degrees) are preferred, but it is noted that as the angle A is reduced, fewer manufacturing challenges may arise (as the radial difference between edges of the tape 120 is reduced).

In some embodiments, the angle A may be 45 degrees, which provides a balance of hoop and axial strength. Such an angle A, however, may require more tape material to assemble a ball bat. Angles A less than 45 degrees present manageable manufacturing challenges while still providing the advantageous effect of interfaces 250 between layers 235 formed by wraps or turns of the tape 210 oriented transverse to the x-axis. In one embodiment, an angle A of 11 degrees, with a tape width W of one inch, presents a good compromise between strength and manufacturability.

Although a bat preform 200 is described as receiving the fiber tape 210, in some embodiments, the preform 200 may be omitted and the fiber tape 210 may form some or all of the full thickness of a bat wall. In such embodiments, a mandrel (with a flared element 230) may replace the preform 200, and the fiber tape 210 may be wrapped around the mandrel. The mandrel may be removed before or after curing the fiber tape 210. Accordingly, the preform 200 or mandrel may form a base structure about which the fiber tape 210 is wrapped.

Figure 6A:
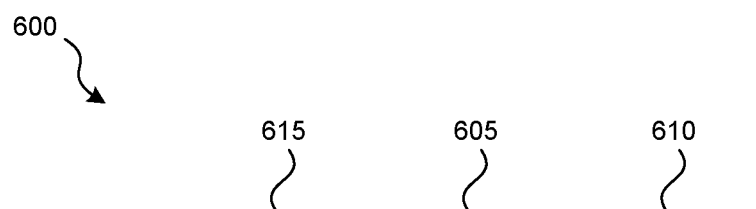
FIG. 6A illustrates a table of example tape widths and orientations of tapes (angles) that may be implemented in bats configured in accordance with some embodiments of the present technology.

FIG. 6A illustrates a table 600 of example angles A (column 605) and tape widths W (column 610) that may be implemented in a bat configured in accordance with some embodiments of the present technology. In the table 600, the angles A (column 605) and tape widths W (column 610) correspond to a tape wrap radial thickness t4 (see FIG. 4) of approximately 0.25 inches (column 615). The dimensions and values in the table 600 are for example only and do not limit the embodiments or implementations of the present technology. Rather, the table 600 illustrates some configurations of bats configured in accordance with various embodiments of the technology.

In some embodiments, the angle A may be a function of the tape width W and the overall bat wall thickness (for example, t3 in FIG. 4). For example, for a selected preform wall 300 thickness and a selected outer skin 330 thickness, if the tape width W is narrowed while keeping the overall bat wall thickness the same, the angle A may be greater and may require more wraps (turns) of the fiber tape 210 to cover the desired length of the bat. The additional wraps (turns) can increase the time, material, and complexity of the manufacturing process. For example, as explained in additional detail above, the greater angle A can distort the tape as it wraps in a circular pattern by stretching one side and compressing the other side. Accordingly, a greater angle A may also include a need for specially tailoring the tape 210 to allow for such distortion (such as stretching or compression). A person of ordinary skill in the art will be able to select a desired angle A, tape width W, overall bat wall thickness t3, or dimensions of other elements for a desired application of embodiments of the present technology.

Figure 7:
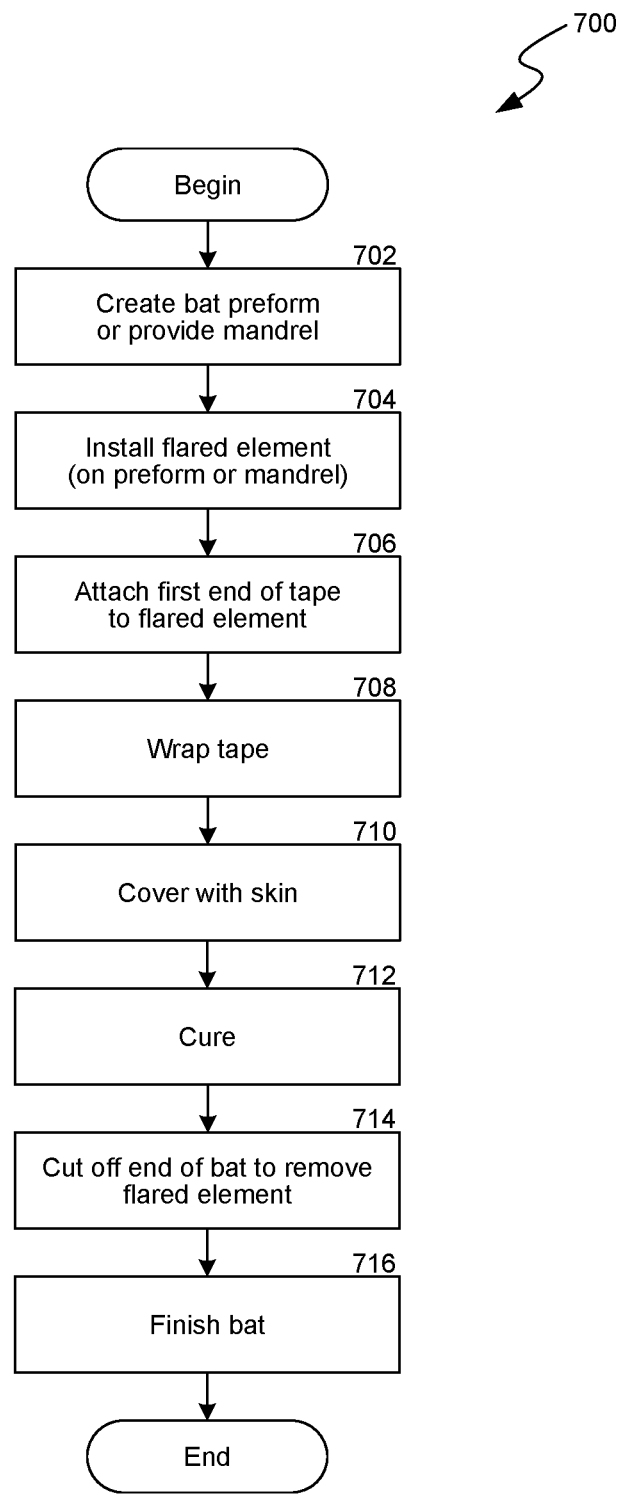
FIG. 7 illustrates a method of making a ball bat in accordance with embodiments of the present technology.

FIG. 7 illustrates a method 700 of making a ball bat in accordance with embodiments of the present technology. Beginning at block 702, an operator may create a bat preform (such as the preform 200) or provide a mandrel. If the flared element is not integral with the preform or mandrel, the flared element may be installed at block 704. At block 706, an operator may begin wrapping the fiber tape by attaching it to, or otherwise placing it on, the flared element.

At block 708, an operator may wrap the fiber tape as a helix around the preform or mandrel until it extends along the desired length of the bat. At block 710, an operator may optionally cover the fiber tape with a skin layer. At block 712, the assembly is cured. In some embodiments, some or all elements of the assembly (such as the preform, the flared element, the tape, or the skin) may be co-cured, while in other embodiments, various elements may be cured at different times.

In some embodiments, at block 714, an operator may cut off the end of the assembly having the flared element to remove the flared element or wedge (leaving only the angled layers of wrapped fiber tape). In other embodiments, the flared element may remain in the assembly and be a permanent part of the final bat. At block 716, an operator may finish the bat by adding an end knob, end cap, indicia, or other elements. Steps of the method 700 may be performed in other suitable sequences and may include additional steps or may omit steps.

Bats configured in accordance with embodiments of the present technology provide several advantages. For example, the interlaminar interfaces between consecutive turns of the fiber tape 210 are oriented transversely relative to the x-axis, which helps to reduce or limit the trampoline effect of a bat as it breaks in, relative to interlaminar interfaces that are oriented along the x-axis. Accordingly, ball bats according to the present technology provide more consistent performance before and after being "broken in."

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, although in some embodiments, the fiber tape 210 may be discontinuous, the fiber tape 210 is preferably one single continuous tape such that only one fiber tape 210 is used to form the transverse interlaminar interfaces described above. A single continuous tape of fiber material helps reduce complexity and waste in the manufacturing process. A single continuous tape of fiber material also helps reduce discontinuities along the bat surface. Because such discontinuities can reduce durability and increase the risk of undesirable performance growth, a single continuous tape can improve durability and control performance relative to a discontinuous tape. Accordingly, embodiments of the present technology include a single continuous tape of fiber material or a minimal quantity of continuous tapes of fiber material to minimize the quantity of discontinuities between tapes. In some embodiments, the straight section 160 includes a single continuous tape, the barrel portion 110 includes a single continuous tape, the ball striking area 180 includes a single continuous tape, or other sections or portions of a ball bat can include a single continuous tape.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A ball bat comprising a handle portion and a barrel portion attached to or continuous with the handle portion along a longitudinal axis of the ball bat, wherein the handle portion comprises a proximal end of the ball bat and the barrel portion comprises a distal end of the ball bat, the ball bat further comprising:
   a flared surface positioned toward the distal end, the flared surface diverging away from the longitudinal axis as the flared surface extends toward the distal end; and
   a tape of fiber material wrapped around the longitudinal axis in a helix extending along the longitudinal axis, wherein an end of the tape is positioned on, or attached to, the flared surface;
   wherein interlaminar interfaces between adjacent turns of the tape are oriented obliquely relative to the longitudinal axis.

2. The ball bat of claim 1, further comprising a preform structure extending along the longitudinal axis, wherein the tape is wrapped around the preform structure.

3. The ball bat of claim 1, further comprising an outer skin positioned radially outwardly from the tape.

4. The ball bat of claim 1, wherein the interlaminar interfaces are oriented at angles between 1 and 45 degrees relative to the longitudinal axis.

5. A ball bat comprising a handle portion and a barrel portion attached to or continuous with the handle portion along a longitudinal axis of the ball bat, wherein the handle portion comprises a proximal end of the ball bat and the barrel portion comprises a distal end of the ball bat, wherein the barrel portion comprises:
   at least part of a preform structure comprising one or more layers of composite material;
   a flared element positioned on the preform structure toward the distal end, the flared element having a surface that diverges away from the longitudinal axis as the surface extends toward the distal end, the surface being oriented transversely to the longitudinal axis;
   a continuous tape of fiber material wrapped around the at least part of the preform structure in a helix extending along the longitudinal axis, wherein interlaminar interfaces between consecutive turns of the helix are oriented at oblique angles relative to the longitudinal axis, and wherein an end of the tape is positioned on, or attached to, the surface; and
   an outer skin positioned around the tape.

6. The ball bat of claim 5, wherein the flared element comprises a discrete ring-shaped wedge element attached to the distal end.

7. The ball bat of claim 5, wherein the flared element is integral to the preform structure.

8. The ball bat of claim 5, wherein the flared element comprises wood, plastic, metal, foam, or composite material.

9. The ball bat of claim 5, wherein the at least part of the preform structure comprises a section having non-uniform thickness, wherein the section having non-uniform thickness is positioned at the sweet spot of the ball bat, and wherein the tape is wrapped around the section having non-uniform thickness.

10. The ball bat of claim 5, wherein the helix of tape extends along less than a full length of the barrel portion, and wherein the barrel portion comprises one or more additional layers of composite laminate material positioned around the preform structure and longitudinally adjacent to an end of the tape.

11. The ball bat of claim 5, wherein the tape extends only between the distal end of the bat and a location that is positioned a distance of three to ten inches from the distal end of the bat.

12. The ball bat of claim 5, wherein the tape comprises prepreg material.

13. The ball bat of claim 5, wherein the oblique angles are greater than 1 degree relative to the longitudinal axis and less than 45 degrees relative to the longitudinal axis.

14. The ball bat of claim 5, wherein the oblique angles are 11 degrees relative to the longitudinal axis, and wherein a width of the tape is one inch.

* * * * *